(12) United States Patent
Tsujino et al.

(10) Patent No.: US 8,326,566 B2
(45) Date of Patent: Dec. 4, 2012

(54) PROGRAM DEVELOPMENT SYSTEM

(75) Inventors: Daisuke Tsujino, Tokyo (JP); Yasuhiro Nishide, Tokyo (JP); Jun Yamazaki, Tokyo (JP); Hirohisa Kusuda, Tokyo (JP)

(73) Assignee: Vodafone Group PLC, Newbury, Berkshire (GB)

( * ) Notice: Subject to any disclaimer, the term of this patent is extended or adjusted under 35 U.S.C. 154(b) by 591 days.

(21) Appl. No.: 12/007,951

(22) Filed: Jan. 17, 2008

(65) Prior Publication Data

US 2008/0234968 A1 Sep. 25, 2008

Related U.S. Application Data (63) Continuation of application No. PCT/JP2006/314284, filed on Jul. 19, 2006.

(30) Foreign Application Priority Data

Jul. 22, 2005 (JP) ................................ 2005-212640

(51) Int. Cl.
*G06F 19/00* (2011.01)

(52) U.S. Cl. ..................................... 702/123

(58) Field of Classification Search ............... 702/5, 57, 702/79–80, 122–123, 141, 150–153; 73/514.01–514.02, 514.16, 514.31, 514.35; 455/67.11, 418–420, 423, 425; 717/124, 717/127–131
See application file for complete search history.

(56) References Cited

U.S. PATENT DOCUMENTS

| 5,835,298 A * | 11/1998 | Edgerton et al. ................ 360/75 |
| 6,567,848 B1 * | 5/2003 | Kusuda et al. ................ 709/219 |
| 7,158,618 B1 * | 1/2007 | Kusuda et al. ............. 379/88.17 |
| 7,391,366 B2 * | 6/2008 | Park et al. ................ 342/357.15 |
| 2001/0032059 A1 * | 10/2001 | Kelly et al. .................... 702/150 |
| 2003/0134665 A1 * | 7/2003 | Kato et al. ..................... 455/566 |
| 2004/0187328 A1 * | 9/2004 | Satoh et al. ..................... 33/356 |

FOREIGN PATENT DOCUMENTS

| JP | 4-242429 | 8/1992 |
| JP | 4-304534 | 10/1992 |
| JP | 9-198279 | 7/1997 |
| JP | 11-119989 | 4/1999 |
| JP | 11-212824 | 8/1999 |
| JP | 2001-272413 | 10/2001 |
| JP | 2003-22196 | 1/2003 |

* cited by examiner

Primary Examiner — Mohamed Charioui
(74) Attorney, Agent, or Firm — Kratz, Quintos & Hanson, LLP (57) ABSTRACT

When an acquisition and reporting control unit of a measurement data processing unit in a development support device sends a sensor measurement start request to a portable information device in response to a collection operation start command from an application under development, an acquisition and reporting control unit of a measurement data processing unit in the portable information device starts measurement operations by a sensor. The measured raw data is continuously sent to the development support device. Data which match the collection condition are collected by a data collection unit. In response to a data request from the program under development, a data reporting unit reports the measurement data which satisfy a reporting condition to the application under development. As a result, when developing an application program which uses the results of measurement by the sensor, it is possible to provide a satisfactory development environment.

18 Claims, 9 Drawing Sheets

PROGRAM DEVELOPMENT SYSTEM

This is a continuation application of the international patent application No. PCT/JP2006/314284 filed with Application date: Jul. 19, 2006. The present application is based on, and claims priority from, J.P. Application 2005-212640, filed on Jul. 22, 2005, the disclosure of which is hereby incorporated by reference herein its entirety.

BACKGROUND OF THE INVENTION

The present invention relates to a program development system, and more particularly relates to a program development system for developing an application program which is executed upon a portable information device upon which a sensor is implemented, and which utilizes the results of measurement by the sensor related to the acceleration or to the attitude angle of the portable information device.

BACKGROUND ART

From the past portable information devices, among which cellular phone devices may be taken as representative, are very widespread. The progress of technology related to such portable information devices, and in particular to cellular phone devices, is very remarkable, and various types of applications such as games and the like have been implemented.

Furthermore, it is proposed to implement a sensor in a portable information device in order to measure an acceleration acting upon it, an attitude angle thereof, or the like, and to utilize the results of measurement by such a sensor in an application which is executed by the portable information device. For example, a cellular phone device is proposed, which is provided with a sensor which measures an acceleration or an angular velocity, and which displays data related to the acceleration or the angular velocity measured by that sensor upon a display means (refer to Patent Document #1).

When developing this type of application program, it is generally practiced to build a program development environment upon a personal computer system. Thus, in the case of an application program which utilizes the results of measurement by the above described type of sensor, pseudo-data consisting of hypothetical results of measurement is prepared in advance and stored in a storage device of the personal computer system. It is arranged, when a data request arrives from the application program under development which is operating upon the personal computer system, to supply, to said application program, this data which has been prepared in advance and stored within said storage device.
Patent Document #1: Japanese Laid-Open Patent Publication 2001-272413

SUMMARY OF THE INVENTION

Problem to be Solved by the Invention

Prior art program development systems as described above are excellent from the aspect of supplying a compact program development environment. However, with prior art program development systems, when applying them to development of an application program which utilizes the results of measurement by a sensor which is implemented upon a portable information device, it has been necessary to prepare data or pseudo-data corresponding to the results of measurement by the above described sensor.

Now, it is normal for the results of measurement by a sensor which is implemented upon a portable information device to change as the portable information device moves. For example, if the sensor is one which measures an acceleration or an attitude angle of the portable information device, the results of measurement by the sensor change from moment to moment, along with movement of the portable information device.

Due to this, in order to create pseudo-data corresponding to the results of measurement by the sensor, it is necessary to create it under the assumption that the portable information device moves. However, there are various types of pattern for how the portable information device may move, and, since an extremely large amount of labor would be required to create and store pseudo-data for all of these patterns, in practice this is not done.

Thus, although pseudo-data may be prepared according to a limited numbers of patterns for how the portable information device may move, to do so leaves open the possibility of the result that the debugging and so on during the development of the application may be insufficient, which would be most undesirable.

The present invention has been conceived in consideration of the situation described above, and it takes it as its objective to provide a program development system which is capable of providing a satisfactory development environment when developing an application program which is to be executed upon a portable information device to which a sensor is implemented, and which utilizes the results of measurement by that sensor.

Means for Solving the Problem

The program development system according to the present invention is a program development system which comprises a portable information device for development and a development support device for executing a program under development, characterized in that: said portable information device for development comprises a sensor which measures an acceleration and an attitude angle of said portable information device for development, and a sensor control means which, in response to a measurement start request from said development support device, along with starting measurement operation by said sensor, also sends the results of measurement by said sensor to said development support device; and said development support device comprises: a sensor measurement control means which, in response to a sensor measurement start command from said program under development, sends said measurement start request to said portable information device for development; a measurement data collection means which, in response to a measurement data collection start command from said program under development, starts collecting measurement data corresponding to said results of measurement, and which stores the collected measurement data in a collected measurement data storage means; and a measurement data reporting means which reports measurement data which satisfy a reporting condition designated by said program under development, to said program under development.

With this program development system, in response to a sensor measurement start command from the program under development, the sensor measurement control means of the development support device sends a measurement start request to the portable information device for development, and the sensor control means of the portable information device for development starts the measurement operation by the sensor. As a result, the measurement operation by the sensor is started, and the results of measurement by the sensor are continuously notified to the sensor control means. Each time notification of the results of measurement is received, the sensor control means sends these results of measurement which have been notified to the development support device.

When, at approximately the same time as the starting of measurement operation by the sensor, in the development support device, the program under development issues a measurement data collection start command, the measurement data collection means starts the collection of the measurement data. The measurement data reporting means reports the measurement data which satisfies the reporting condition to the program under development. It should be understood that it would also be acceptable for the program under development to issue the sensor measurement start command and the measurement data collection start command both simultaneously, with the same command.

As a result, no pseudo-data is created corresponding to results of measurement by the sensor; instead, by actually moving the cellular phone device for development, measurement data is supplied to the program under development according to the results of measurement of the sensor which correspond to various types of patterns of movement method. Thus, according to the program development system of the present invention, it is possible to provide a satisfactory development environment when developing an application program which is to be executed upon a portable information device on which a sensor is implemented, and which utilizes the results of measurement by the sensor.

With the program development system of the present invention, the sensor may be one which measures: acceleration in at least two axial directions among a first axis, a second axis which is orthogonal to said first axis, and a third axis which is orthogonal to said first axis and to said second axis, defined intrinsically to said portable information device; and rotational angle around said first axis, rotational angle around said second axis, and rotational angle around said third axis, from a reference angle of said portable information device.

With the program development system of the present invention, it may be arranged for said measurement data reporting means, when a measurement data report request has been received from said program under development, to report measurement data satisfying said reporting condition to said program under development.

Here, it may be arranged for said measurement data reporting request to be accompanied by said reporting condition.

If the measurement data reporting request is accompanied by the reporting condition, then it may be arranged for said measurement data which satisfies said reporting condition to be the newest measurement data within said collected measurement data storage means. In this case, the program under development may acquire the most recent measurement data which satisfies the data collection condition at the time point that the data was requested.

Furthermore, if the measurement data reporting request is accompanied by the reporting condition, then it may be arranged to satisfy the conditions that: (a) said measurement data which satisfies said reporting condition is newer measurement data stored in the collected measurement data storage means than the measurement data which was reported in response to the previous measurement data report request, and moreover (b) it is the designated number of items of measurement data, as designated by said program under development, when considered along the direction in which time elapses, from the oldest among the data which can be reported which is measurement data present within said collected measurement data storage means. In this case, the collected measurement data storage means may be used as a FIFO (First In First Out) type storage means.

Here, said support device for development may further comprise a number of measurement data items reporting means which, when a request for notification of the number of said data items which can be reported has been received from said program under development, reports the number of said data items which can be reported to said program under development. In this case, since the number of data items within the collected measurement data storage means which can be reported is known before the measurement data request, accordingly, by issuing a measurement data request in which said desired number is specified as the designated number of data items, after having confirmed the existence of at least this desired number of data items which can be reported, the program under development is able reliably to acquire the desired number of items of measurement data.

With the program development system of the present invention, it may be arranged, along with said measurement data collection start command being accompanied by a collection condition, for said measurement data collection means to collect measurement data which satisfies said collection condition. In this case, due to the program under development designating this desired collection condition, measurement data which matches said collection condition is collected by the measurement data collection means.

Here, said collection condition may consist of a collection period. In this case, after the measurement data collection start request, the measurement data collection means collects measurement data each time the collection period elapses, and stores this data in the collected measurement data means.

With the program development system of the present invention, it may be arranged, along with said measurement data collection start command being accompanied by a collection condition and said reporting condition, for said measurement data collection means to collect measurement data which satisfies said collection condition. In this case, the program under development designates the desired collection condition and reporting condition. When the measurement data collection means completes measurement data which satisfies the reporting condition while partway through performing the collection of measurement data which matches the collection condition, it reports to the program under development the fact that data which satisfies the reporting condition or data which satisfies the reporting condition has been completed. Here, when the fact that data which satisfies the reporting condition has been completed is reported, the program under development is able to acquire the desired data, by simply issuing a request for the measurement data, without designating any number of data items or the like.

With the program development system of the present invention, it may be arranged for said measurement data collection means, in response to a measurement data collection stop request from said program under development, to stop the collection of said measurement data. In this case, by issuing a measurement data collection stop request at a desired time point, the program under development is able to stop the collection of measurement data by the measurement data collection means.

Furthermore, with the program development system of the present invention, it may be arranged for said sensor measurement control means, in response to a measurement stop command from said program under development, to send a measurement stop request to said portable information device for development, and for said sensor control means to stop the measurement operation by said sensor in response to said measurement stop request. In this case, by issuing a measurement data collection stop request at a desired time point, the program under development is able to stop the collection of measurement data by the sensor.

It should be understood that it would also be acceptable for the program under development to perform both the sensor measurement stop command, and also the measurement data collection stop command, simultaneously with the same command.

As explained above, according to the program development system of the present invention, the advantageous effect is obtained that it is possible to provide a satisfactory development environment when developing an application program which is to be executed upon a portable information device to which a sensor is implemented, and which utilizes the results of measurement by that sensor.

DETAILED DESCRIPTION

In the following, an embodiment of the present invention will be explained with reference to FIGS. 1 through 9. It should be understood that, in these figures, the same reference symbol is appended to elements which are the same or equivalent, and duplicate explanation will be omitted.

Structure

Figure 1:
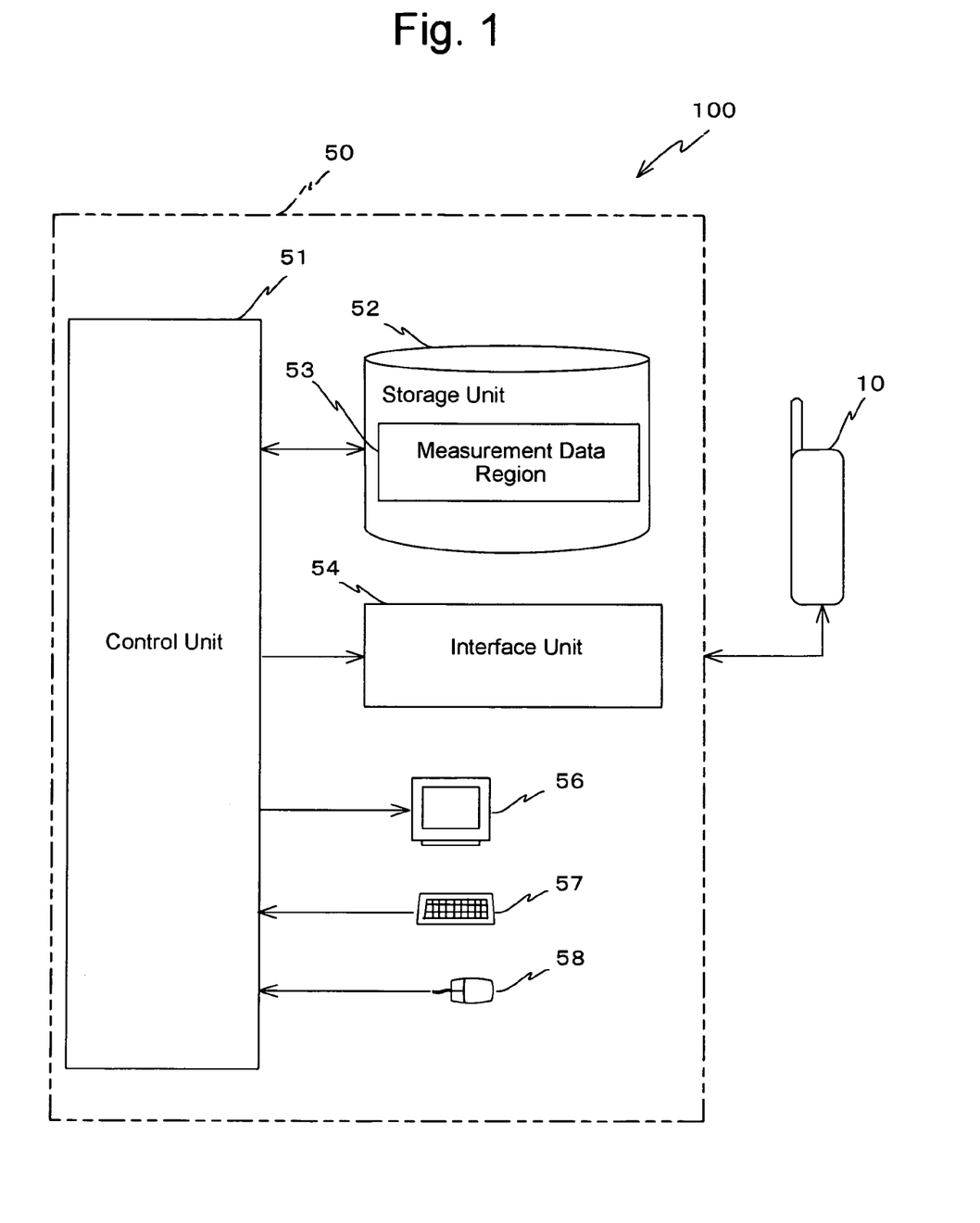
FIG. 1 is a block diagram schematically showing the structure of a program development system according to an embodiment of the present invention.

In FIG. 1, there is schematically shown the structure of a program development system 100 according to an embodiment. As shown in FIG. 1, this program development system 100 comprises a cellular phone device for development 10, which is a portable information device for development, and a development support device 50.

The cellular phone device for development 10, along with being able to operate in a normal mode in which it operates in a manner similar to that of a cellular phone device upon which an application program which is developed by utilizing this program development system 100 is able to operate, also is capable of operating in a development mode in which functions which are peculiar to its function as a cellular phone device for development are fulfilled. The changeover from the normal mode to the development mode, and the method of operating during the development mode, will be described hereinafter.

Figure 2A:
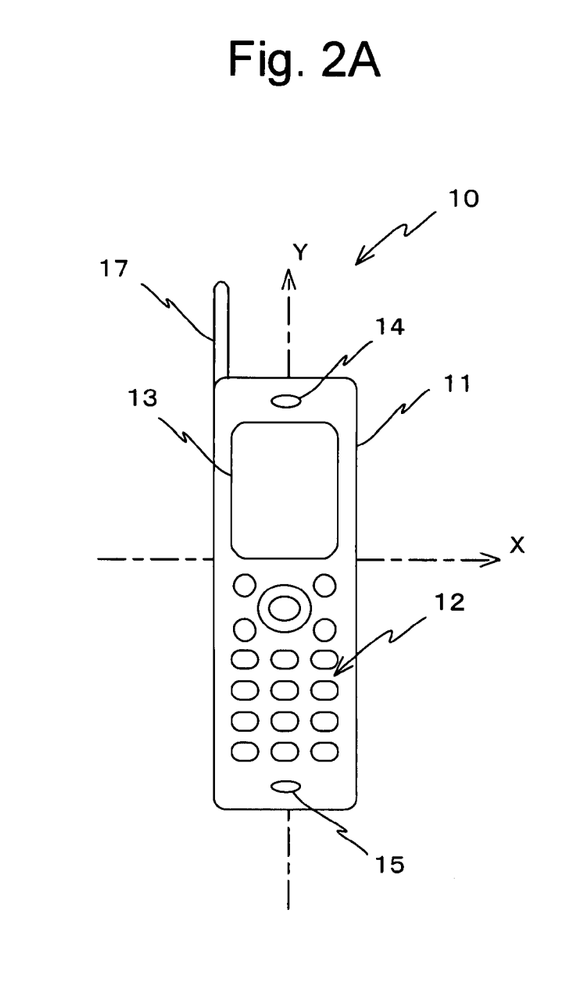
FIG. 2A is an elevation view schematically showing the external appearance of a cellular phone device of FIG. 1.
Figure 2B:
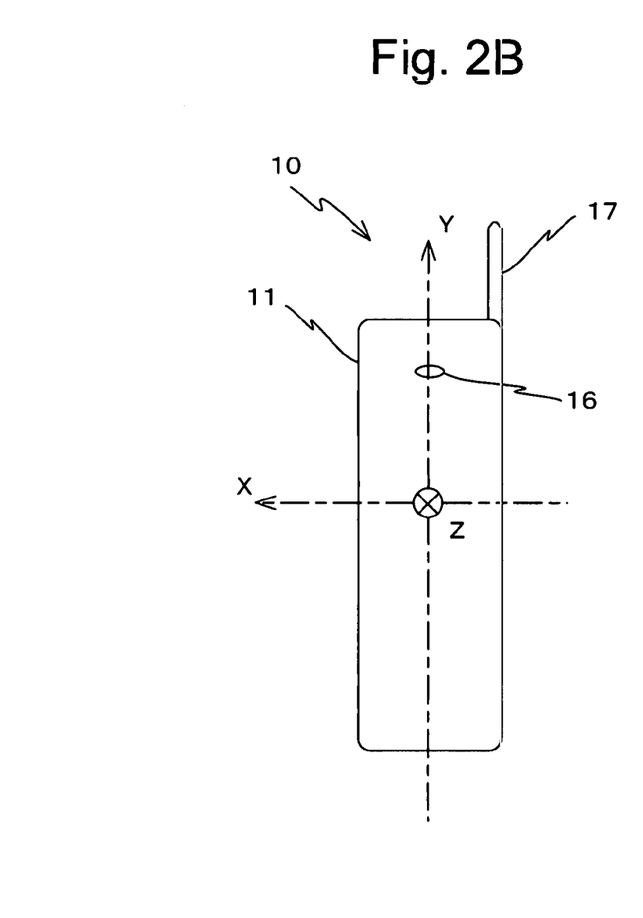
FIG. 2B is a rear view schematically showing the external appearance of the cellular phone device of FIG. 1.

As shown in FIGS. 2A and 2B, this cellular phone device for development 10 comprises (a) a cellular phone main body 11; (b) an actuation unit 12 which includes a numeral key pad for input of telephone numbers, and function keys for inputting various types of command and changeover of operational mode and the like to a control unit 21 which will be described hereinafter (refer to FIGS. 2A and 2B); and (c) a display unit 13 including a liquid crystal display device which displays operational guidance, the operational state, received messages, and the like. Moreover, this cellular phone device for development 10 comprises (d) a speaker for telephone conversation 14 which, during a telephone conversation, replays an audio voice signal sent from the opposite party to communication; (e) a microphone 15 for inputting sound during capture and for inputting audio during a telephone conversation; (f) a speaker for guidance 16 for generating ring tones and guidance sounds; and (g) an antenna 17 for transfer of wireless signals to and from a base station.

Figure 3:
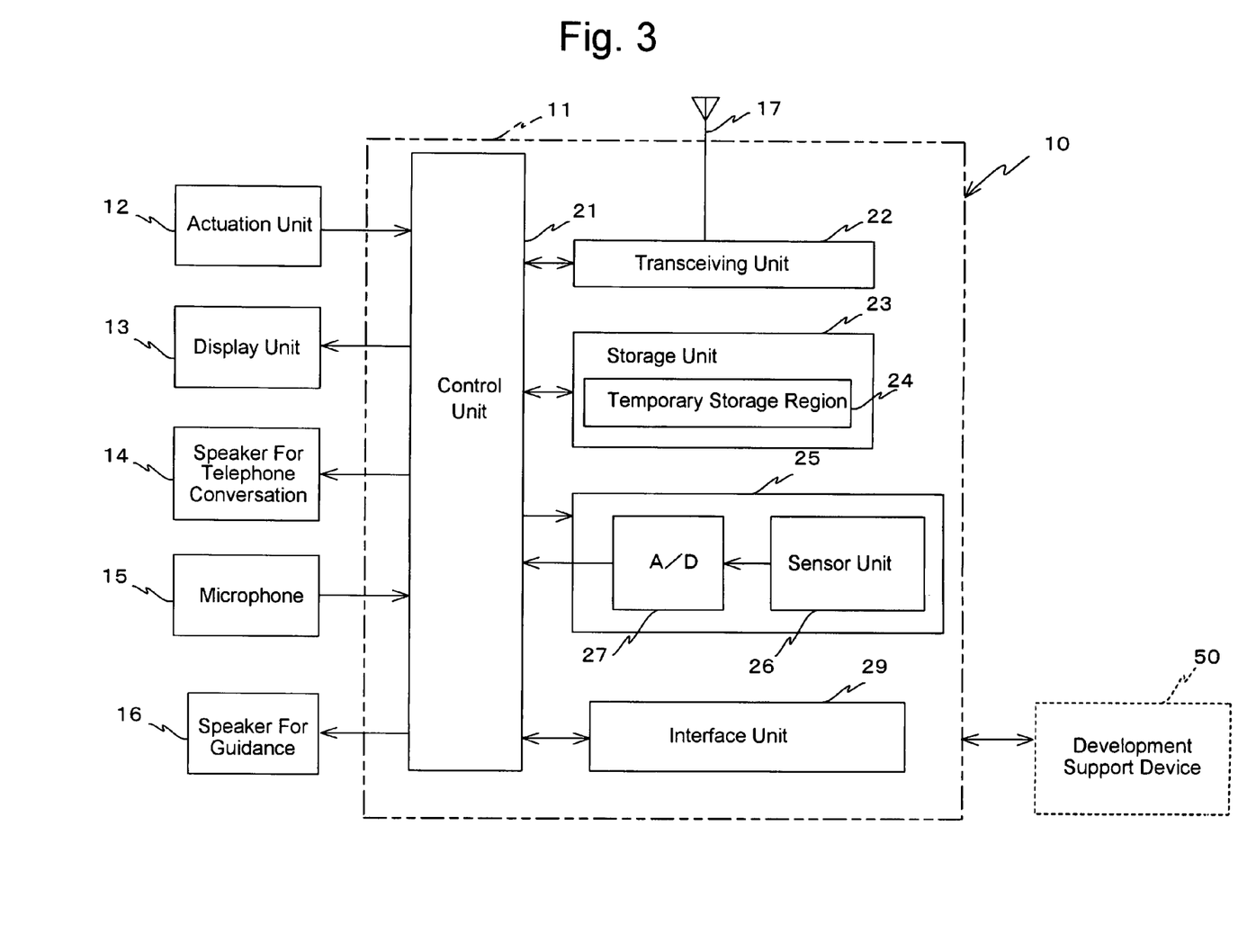
FIG. 3 is a functional block diagram for explanation of the internal structure of the cellular phone device of FIG. 2.

As shown in FIG. 3, in the interior of the cellular phone main body 11, there are comprised (i) a control unit 21 which controls the operation of the entire cellular phone device for development 10 as a whole; (ii) a transceiving unit 22 which performs transmission and reception of wireless signals to and from a base station, via the antenna 17; and (iii) a storage unit 23 which stores various types of data such as programs which are executed by the control unit 21, and which comprises a dedicated read only memory (ROM) element and a random access memory (RAM) element. Moreover, in the interior of the cellular phone main body 11, there are comprised (iv) a sensor unit 25 for measuring an attitude angle of this cellular phone device for development 10 and an acceleration which acts upon this cellular phone device for development 10; and (v) an interface unit 29 for performing communication with the development support device 50.

The storage unit 23 includes, in its interior, a temporary storage region 24 which temporarily stores measurement data which has been collected. This temporary storage region 24 is used when an application program is executed after development.

The sensor unit 25 comprises a sensor portion 26 which detects an attitude angle of the cellular phone device for development 10 and an acceleration which acts upon the cellular phone device for development 10, and an analog/digital (A/D) converter 27 which converts the voltage value of the voltage signal from the sensor portion 26 to a digital value. The digital data which is outputted from the A/D converter is notified to the control unit 21 as measured raw data. Moreover, the sensor unit 25 is adapted to start its operation upon receipt of a measurement start command from the control unit 21, and to stop its operation upon receipt of a measurement stop command from the control unit 21.

The sensor portion 26, along with taking the row direction in the matrix form key array of the actuation unit 12 as the X axis direction and its column direction as the Y axis direction, also, in this embodiment, takes an attitude, in which the XY plane is parallel with the horizontal plane and the +Y direction is the due north direction, as a reference attitude, and detects the rotational angle from said reference attitude around the X axis (the pitch angle $\theta_X$), the rotational angle around the Y axis (the roll angle $\theta_Y$), and the rotational angle around a Z axis which is parallel to the vertical direction (the yaw angle $\theta_Z$). Moreover, the sensor portion 26 detects the acceleration ($\alpha_X$) in the X direction and the acceleration ($\alpha_Y$) in the Y direction. The sensor unit 25 makes the detection results corresponding to the pitch angle $\theta_X$, the roll angle $\theta_Y$, the yaw angle $\theta_Z$, the X direction acceleration $\alpha_X$, and the Y direction acceleration $\alpha_Y$ at each measurement time point into one set, which it notifies to the control unit 21 as data generated by measurement.

This control unit 21 comprises a central processing unit (CPU), a digital signal processing device (DSP), and the like, and, along with performing various kinds of data processing in order to implement the conventional functions of a cellular phone, also is adapted to perform operational control of the other structural elements described above. The structure of the software, such as programs and the like, executed by this control unit 21 is as shown in FIG. 3.

Figure 4:
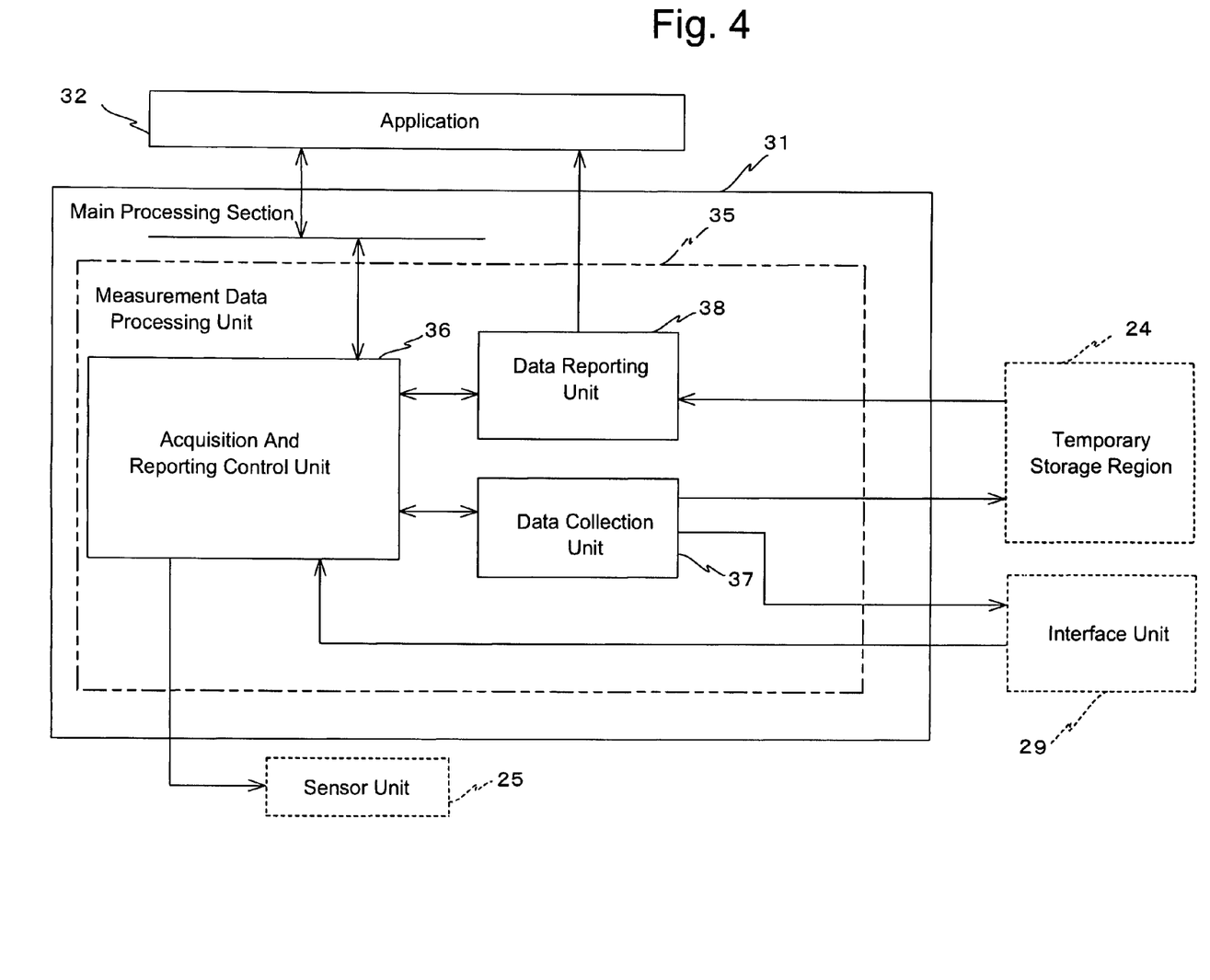
FIG. 4 is a figure for explanation of the structure of software which is executed by a control unit of FIG. 3.

In other words, the software which is executed by the control unit 21 consists of: (i) a main processing section 31 which, along with implementing a telephone conversation function, a mail function, and a character input function, which are the basic functions as a cellular phone, also performs control of the various types of hardware resource described above; and also, if present, (ii) an application program 32 (hereinafter simply termed "the application 32") for supplying various contents such as a game or the like to the user.

The main processing section 31 includes a measurement data processing unit 35. This measurement data processing unit 35 comprises an acquisition and reporting control unit 36, a data collection unit 37, and a data reporting unit 38.

The acquisition and reporting control unit, along with processing commands from the application 32 during the normal mode and processing commands from the development support device 50 during the development mode, also performs control of the measurement operation of the sensor unit 25 and control of the measurement data processing unit 35 as a whole. Here, among the commands from the development support device 50, there is included a development mode setting request to change over from the normal mode to the development mode. When a development mode setting request is received, the acquisition and reporting control unit 36 sends a command to the data collection unit 37, commanding it to change over to development mode operation. As a result, the measurement data processing unit 35 starts to perform development mode operation.

While the measurement data processing unit 35 is performing operation in the development mode, even if a command from the application 32 is received, the acquisition and reporting control unit 36 ignores that command. Furthermore, while the measurement data processing unit 35 is performing operation in the normal mode, even if the measurement data processing unit 35 receives a command from the development support device 50, it ignores that command, with the exception of an operational mode setting command.

It should be understood that, when the power supply of the cellular phone device for development 10 is turned ON, the measurement data processing unit 35 is adapted to perform operation in the normal operational mode.

During the normal mode, the data collection unit 37 stores measurement data which satisfies a data collection condition determined by the application 32 in the measurement data temporary storage region 24 within the storage unit 23 described above. Here, the data collection unit 37 includes offset compensation information which has been measured in advance, and physical quantity conversion information, which is for converting from the data after offset compensation into data which directly reflects physical quantities such as angles or accelerations. The data collection unit 37 is adapted to execute offset compensation and physical quantity conversion in sequence upon the measured raw data from the sensor unit 25, and thereby to calculate the measurement data.

It should be understood that, during the normal mode, it is arranged for the data collection unit 37, when storing data in the temporary storage region 24, to use the temporary storage region 24 as a ring buffer. In other words, the data collection unit 37 sequentially updates the storage address in the temporary storage region 24 each time data is stored. After having stored data up to the last address in the temporary storage region 24, it performs storage of new data from the first address in the temporary storage region 24.

On the other hand, during the development mode, upon receipt from the sensor unit 25 of measured raw data, the data collection unit 37 sends this measured raw data to the development support device 50 via the interface unit 29. Furthermore, upon receipt of an information for measurement data conversion request from the acquisition and reporting control unit 36, the data collection unit 37 sends the measurement data conversion information to the development support device 50 via the interface unit 29. It should be understood that, upon this information for measurement data conversion request, it is arranged for the acquisition and reporting control unit 36, which has received the measurement data conversion information from the development support device 50, to send it to the data collection unit 37.

The data reporting unit 38 reports to the application 32 those measurement data items, among the measurement data stored in the temporary storage region 24, which satisfy a data reporting condition specified by the parameter of the data request issued by the application 32. Furthermore, the data reporting unit 38 reports to the application 32 the number of items of measurement data, among the measurement data stored in the temporary storage region 24, which can be reported to the application 32. It should be understood that, during the development mode, the data reporting unit 38 does not operate.

Returning to FIG. 1, the development support device 50 comprises: (i) a control unit 51 which controls the operation of the entire development support device 50 as a whole; (ii) a storage unit 52 which stores various kinds of data; and (iii) an interface unit 54 for performing communication with the development support device 50. Here, the storage unit 52 includes, in its interior, a measurement data region 53 which temporarily stores the measurement data which has been collected.

Moreover, the development support device 50 comprises (iv) a display device 56 such as a liquid crystal display device or the like, which displays images or characters based upon control by the control unit 51; (v) a stroke device 57 such as a keyboard or the like, which inputs commands or data to the control unit 51; and (vi) a pointing device 58 such as a mouse or the like, which inputs a position upon the screen of the display device 56 to the control unit 51.

It should be understood that, in this embodiment, the development support device 50 consists of a personal computer system.

Figure 5:
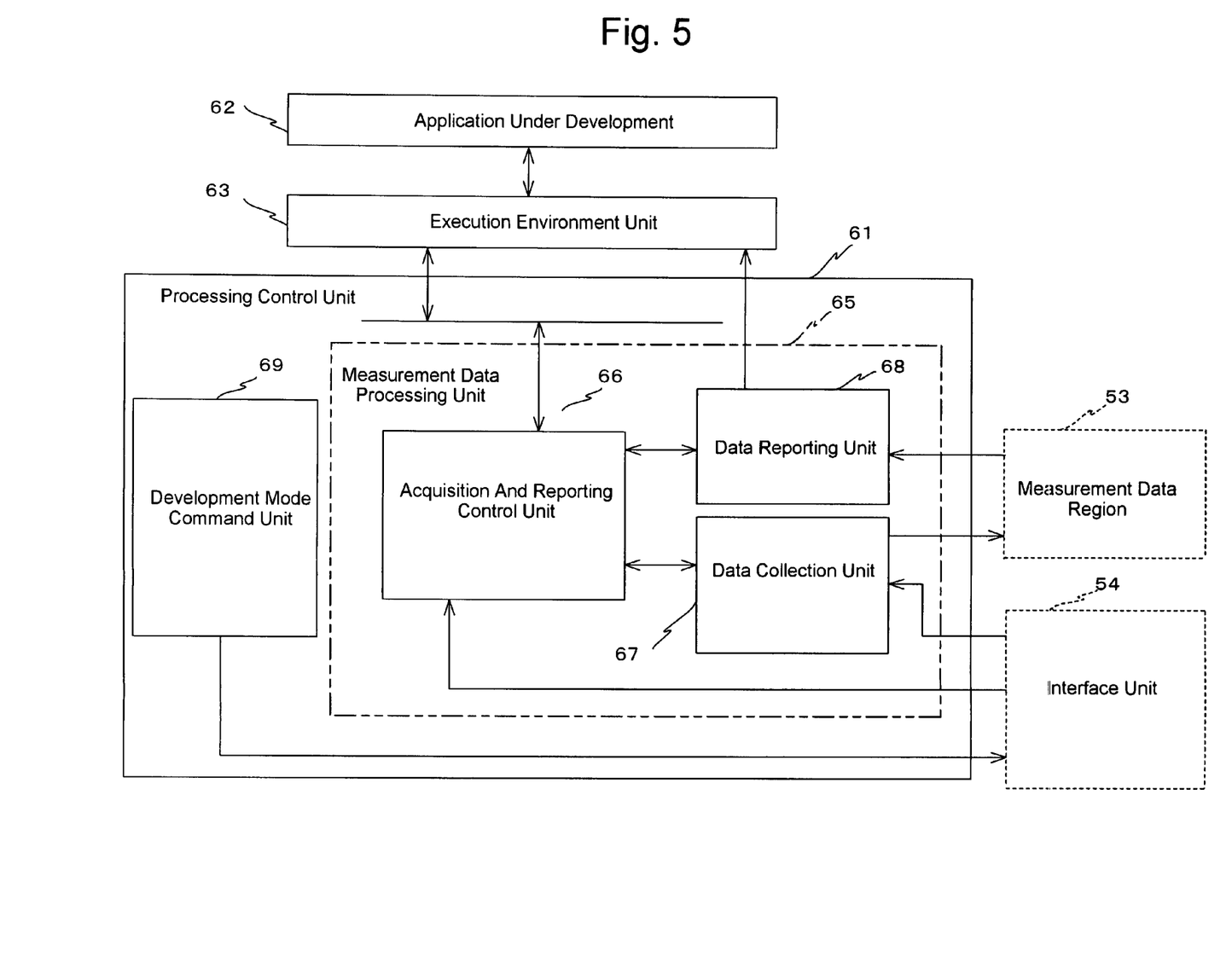
FIG. 5 is a figure for explanation of the structure of software which is executed by a control unit of a development support device of FIG. 1.

The control unit 51 comprises a central processing device (CPU) and the like, and, along with performing various types of processing, also is adapted to perform operational control of the other structural elements described above. The structure of the software which is executed by this control unit 51 is as shown in FIG. 5.

In other words, the software which is executed by the control unit 51 comprises (i) a processing control unit 61 which, along with performing various kinds of processing for program development, also controls the development support device 50 as a whole; (ii) an application program 62 under development (hereinafter simply termed the "application under development 62"); and (iii) an execution environment unit 63 which provides an execution environment to the application program under development 62, within the development support device 50.

Here, the application under development 62 is one which, after development, will be executed upon a cellular phone device which performs similar operations to those performed by the cellular phone device for development 10 when it is operating in the normal mode. Moreover, the execution environment unit 63 is a set of programs which supply software resources for performing execution of the application under development 62, i.e. command conversion between the application under development 62 and the processing control unit 61, management of the application under development 62, and so on. A similar operational environment is provided by this execution environment unit 63 to the application under development 62, as when that application is being executed upon a cellular phone device.

The processing control unit 61 comprises a measurement data processing unit 65 and a development mode command unit 69. Here, the development mode command unit 69 sends a development mode setting request via the interface unit 54 to the cellular phone device for development 10, in response to a development mode setting command which is performed via the stroke device 57 or the pointing device 58 by the user of this development support device, in other words by the program developer.

The measurement data processing unit 65 comprises an acquisition and reporting control unit 66, a data collection unit 67, and a data reporting unit 68.

The acquisition and reporting control unit 66 processes commands from the application under development 62 related to measurement data collection and reporting. Moreover, the acquisition and reporting control unit 66 performs control of measurement operations of the sensor unit 25 which are implemented within the cellular phone device for development 10, and overall control of the measurement data processing unit 65.

The data collection unit 67 stores, in a measurement data region within the storage unit 52 described above, the measurement data which satisfy the data collection condition which is designated by the application under development 62. Here, this data collection unit 67 has measurement data conversion information which has been reported in advance from the cellular phone device for development 10. The data collection unit 67 is adapted to implement offset compensation and physical quantity conversion in sequence upon the measured raw data from the sensor unit 25, and to calculate the measurement data.

It should be understood that the operation of acquisition from the cellular phone device for development 10 of the measurement data conversion information, used by the data collection unit 67, will be described hereinafter.

When storing the data in the measurement data region 53, the data collection unit 67 is adapted to use the measurement data region 53 as a ring buffer. Thus, the data collection unit 67 manages a start pointer for specifying the storage address of the oldest measurement data in the measurement data region 53 which, as described above, is used as a ring buffer, and an end pointer for specifying the next storage address for storing the measurement data. When it has received notification of the collection cycle time, the data collection unit 67 is adapted to set the value of the start pointer and the value of the end pointer to the same value (for example, to the starting address of the measurement data region 53). It should be understood that the values of the start pointer and of the end pointer can be referred to by the data reporting unit 68.

Among the measurement data stored in the measurement data region 53, the data reporting unit 68 reports to the application under development 62 those measurement data items which satisfy the data reporting condition set by the parameter in the data request issued by the application under development 62. Moreover, the data reporting unit 68 reports to the application under development 62 the number of measurement data items, among the measurement data stored in the measurement data region 53, which can thus be reported to the application under development 62.

As described above, the measurement data processing unit 65 in the development support device 50 has a structure almost similar to that of the measurement data processing unit 35 in the cellular phone device for development 10, and performs operations which are almost the same as those which the measurement data processing unit 35 performs in the normal mode. As a result, the application under development 62 is capable of operating upon the development support device 50, without any consciousness of discrepancy with when it is operating with the cellular phone device upon which it is finally to be executed.

Acquisition of the Measurement Data

Next, the operation of acquisition of the measurement data by the application under development 62 in the program development system 100 having the structure described above will be explained. It should be understood that, with the cellular phone device for development 10, it is supposed that the measurement data conversion information is obtained by measurement in advance.

Before the operation of acquisition of measurement data by the application under development 62, the operational mode of the cellular phone device for development 10 is set to the development mode. During this setting, the developer actuates the stroke device 57 or the pointing device 58, and inputs the fact that the operational mode of the cellular phone device for development 10 must be set to the development mode. In response to this input, the development mode command unit 69 sends a development mode setting request via the interface unit 54 to the cellular phone device for development 10.

In the cellular phone device for development 10, this development mode setting request is received via the interface unit 29 by the acquisition and reporting control unit 36. Upon receipt of this development mode setting request, the acquisition and reporting control unit 36, along with sending a command that development mode operation must be performed to the data collection unit 37, also goes into a state in which it only processes commands from the development support device 50. Moreover, upon receipt of this command that development mode operation must be performed, when it has received measured raw data from the sensor unit 25, the data collection unit 37 sends this measured raw data via the interface unit 29 to the development support device 50.

After the operational mode of the cellular phone device for development has been set to the development mode as described above, the acquisition operation for the measurement data is performed at the initiative of the application under development 62, as described below.

Acquisition of the Most Recent Data During Data Collection

Figure 6:
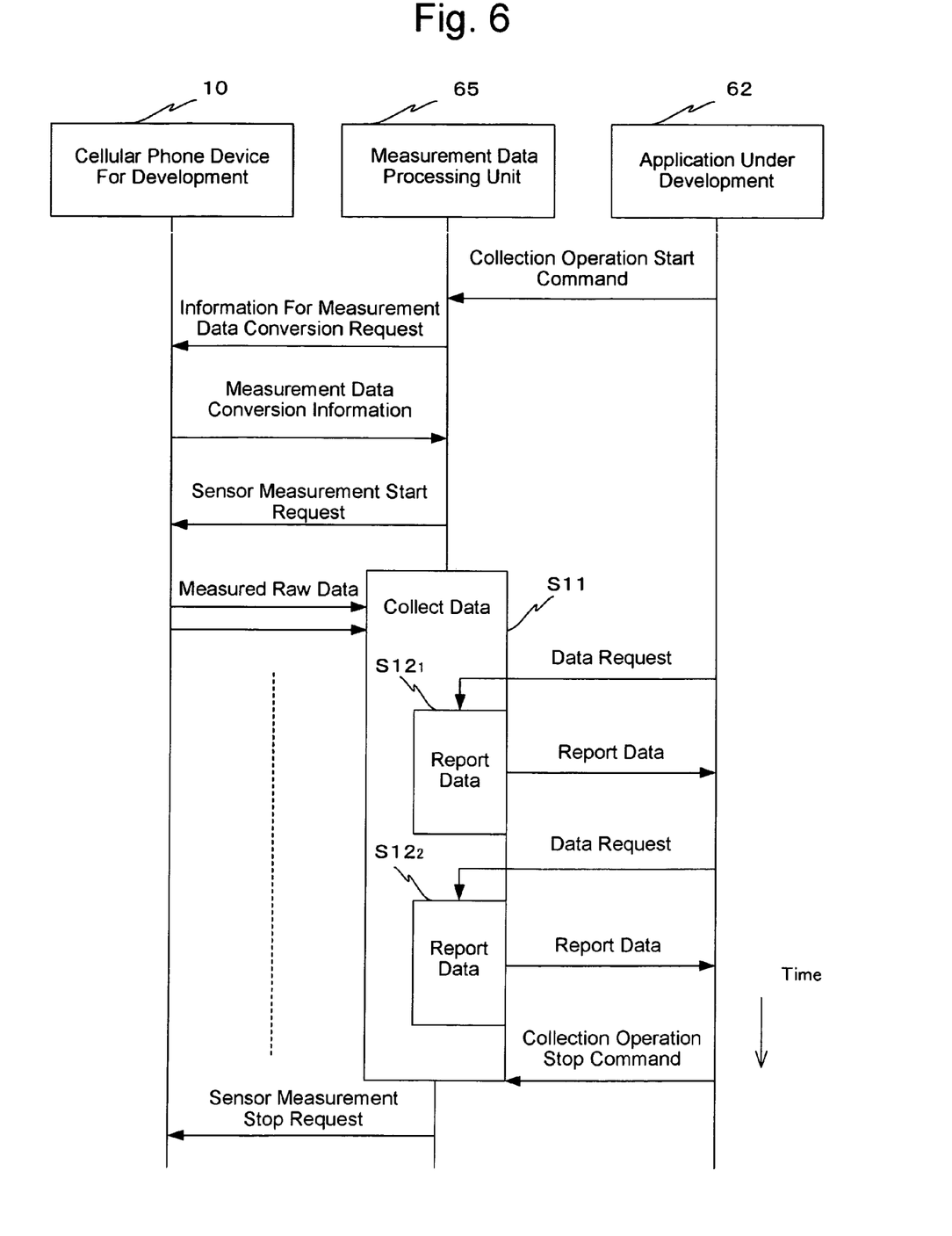
FIG. 6 is a sequence diagram for explanation of acquisition processing for most recent measurement data.

In the acquisition of the most recent data during data collection, as shown in FIG. 6, first, the application under development 62 sends, to the measurement data processing unit 65, a collection operation start command with the data collection period TP1 as a parameter. Here, as the data collection period TP1, an integer multiple of the notification period of the data from the sensor unit 25, periodically generated by measurement, is designated.

By this collection operating setting command, the measurement data processing unit 65 is notified that the measurement data which satisfies the data collection condition is the measurement data which is initially obtained after the collection operation start command, and the measurement data which is sequentially obtained thereafter over an interval of the data collection period TP1.

In the measurement data processing unit 65, the acquisition and reporting control unit 66 receives this collection operation start command. Upon receipt of the collection operation start command, the acquisition and reporting control unit 66 first sends an information for measurement data conversion request via the interface unit 54 to the cellular phone device for development 10. In the cellular phone device for development 10, this information for measurement data conversion request is received by the acquisition and reporting control unit 36 of the measurement data processing unit 35.

Upon receipt of this information for measurement data conversion request, the acquisition and reporting control unit 36 sends a transmit command for measurement data conversion information to the data collection unit 37. Upon receipt of this transmit command, the data collection unit 37 sends the measurement data conversion information which it holds via the interface 29 to the development support device 50.

In the development support device 50, the acquisition and reporting control unit 66 receives the measurement data conversion information. The acquisition and reporting control unit 66 sends this measurement data conversion information which it has received to the data collection unit 67. Upon receipt of this measurement data conversion information, the data collection unit 67 uses this measurement data conversion information in conversion of the measured raw data into measurement data, until newer measurement data conversion information is received.

Next, the acquisition and reporting control unit 66, along with sending a sensor measurement start request via the interface unit 54 to the cellular phone device for development 10, also notifies the data collection unit 67 of the data collection period TP1, which constitutes the data collection condition. Upon receipt of this notification, the data collection unit 67 starts the data collection processing of the step S11.

In the cellular phone device for development 10, the sensor measurement start request is received by the acquisition and reporting control unit 36 of the measurement data processing unit 35. Upon receipt of this sensor measurement start request, the acquisition and reporting control unit 36 sends a sensor measurement start command to the sensor unit 25. Upon receipt of this sensor measurement start command, the sensor unit 25 starts sensor operation, and, after the detection result from the sensor portion 26 has been digitalized by the A/D converter 27, it is outputted periodically (for example at a 1 msec cycle) to the control unit 21 (in more detail, to the data collection unit 37) as measured raw data.

After this, each time measured raw data is received, the data collection unit 37 sends this measured raw data via the interface unit 29 to the development support device 50.

Figure 7:
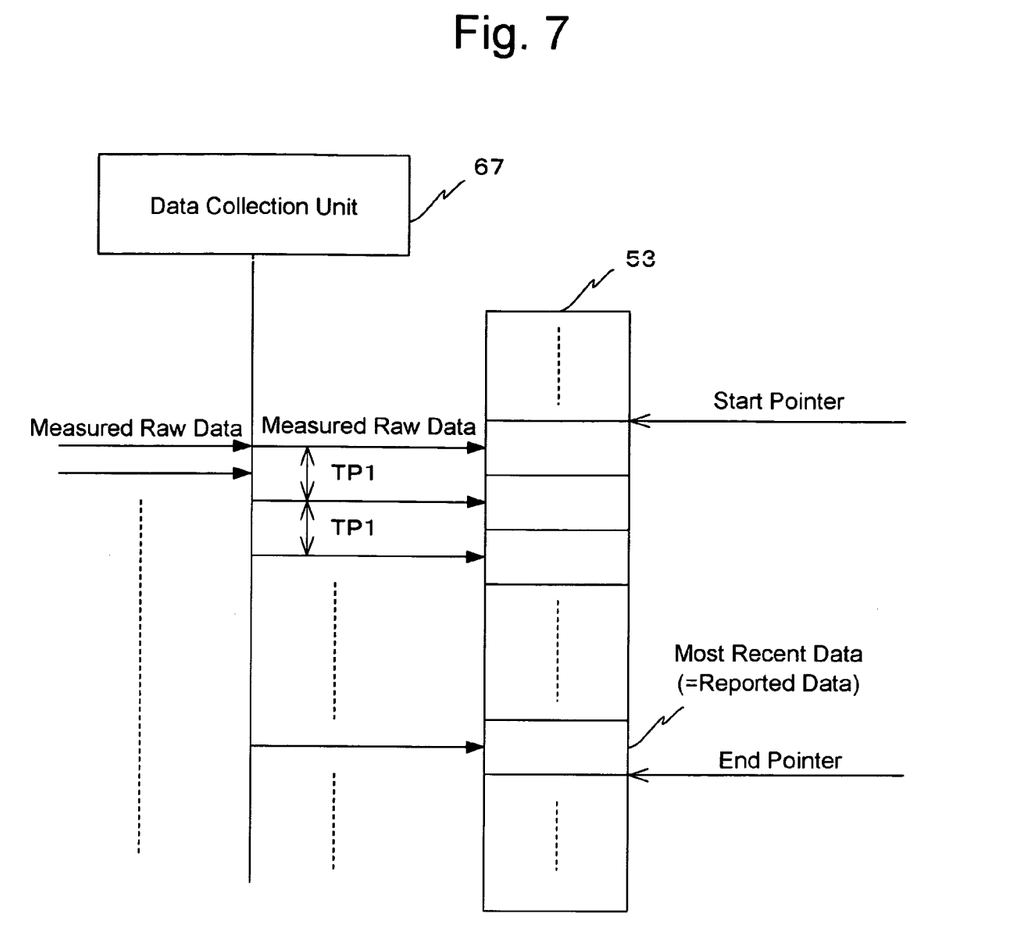
FIG. 7 is a figure for explanation of data collection during acquisition processing for most recent measurement data.

In the step S11 the data collection unit 67, upon initial receipt of the measured raw data from the cellular phone device for development 10, first performs offset compensation and physical quantity conversion in sequence, and calculates measurement data corresponding to said measured raw data. Next, the data collection unit 67 stores the measurement data which it has thus calculated in the measurement data region 53. Subsequently, each time it receives measured raw data from the cellular phone device for development 10 over an interval of the cycle time TP1, the data collection unit 67 calculates measurement data corresponding to said measured raw data, and stores that measurement data in the measurement data region 53 in sequence. It should be understood that, each time the data collection unit 67 thus stores measurement data in the measurement data region 53, it updates the end pointer value (and, according to requirements, the start pointer value). The data collection operation, and the operation of storage in the measurement data region 53, thus performed by the data collection unit 67 in this step S11 are shown in FIG. 7.

Returning to FIG. 6, at a desired time point during the above described data collection by the data collection unit 67, the application under development 62 sends to the measurement data processing unit 65, via the execution environment unit 63, a data request which specifies that a report of the most recent measurement data in the measurement data stored in the measurement data region 53 is requested (hereinafter this is termed a "most recent measurement data request"). In the measurement data processing unit 65, the acquisition and reporting control unit 66 receives this most recent measurement data request. Next, the acquisition and reporting control unit 66 notifies the data reporting unit 68 that it has received this most recent measurement data request. Upon receipt of this notification, the data reporting unit 68 starts data reporting processing in the step S12 (in FIG. 6, this is shown as the step S12$_1$ or the step S12$_2$).

In the step S12, first, the data reporting unit 68 refers to the end pointer value. Next, the data reporting unit 68 reads out the most recent measurement data from the measurement data region, based upon this end pointer value. The data reporting unit 68 reports this measurement data which it has read out as report data to the application under development 62, via the execution environment unit 63. Moreover, the data reporting unit 68 notifies the acquisition and reporting control unit 66 that the data reporting task has been completed. In this manner, the processing of the step S1 ends.

It should be understood that, after the acquisition and reporting control unit 36 has issued the sensor measurement start command, the sensor unit 25 continues its sensor operation, and continues periodically to output measured raw data. The data collection unit 37 continuously performs the operation of transmitting the measured raw data from the sensor unit 25 to the development support device 50. In this situation, stopping the operation of the sensor unit 25 and the data collection unit 37 is performed in the following manner.

When stopping the detection operation of the sensor unit 25 and the operation of transmission of the measured raw data in the data collection unit 37, first, the application under development 62, at a desired time, sends a collection operation stop command to the measurement data processing unit 35. In the measurement data processing unit 35, the acquisition and reporting control unit 36 of the measurement data processing unit 35 receives this collection operation stop command.

Upon receipt of this collection operation stop command, the acquisition and reporting control unit 36, along with notifying the data collection unit 67 of the stoppage of the collection operation, also sends a sensor measurement stop request via the interface unit 54 to the cellular phone device for development 10. In the cellular phone device for development 10, the acquisition and reporting control unit 36 of the measurement data processing unit 35 receives this sensor measurement stop request. Upon receipt of this sensor measurement stop request, the acquisition and reporting control unit 36 sends a sensor measurement stop command to the sensor unit 25. When the sensor unit 25 receives this sensor measurement start command, it stops the sensor operation. Since, as a result, the output of the measured raw data from the sensor unit 25 stops, accordingly the operation of transmission of the measured raw data from the data collection unit 37 ceases to be performed.

By processing like the above being performed, the application under development 62 is able to acquire the most recent measurement data, among the measurement data which is stored in the measurement data region 53.

Bulk Acquisition of Measurement Data During Data Collection

Figure 8:
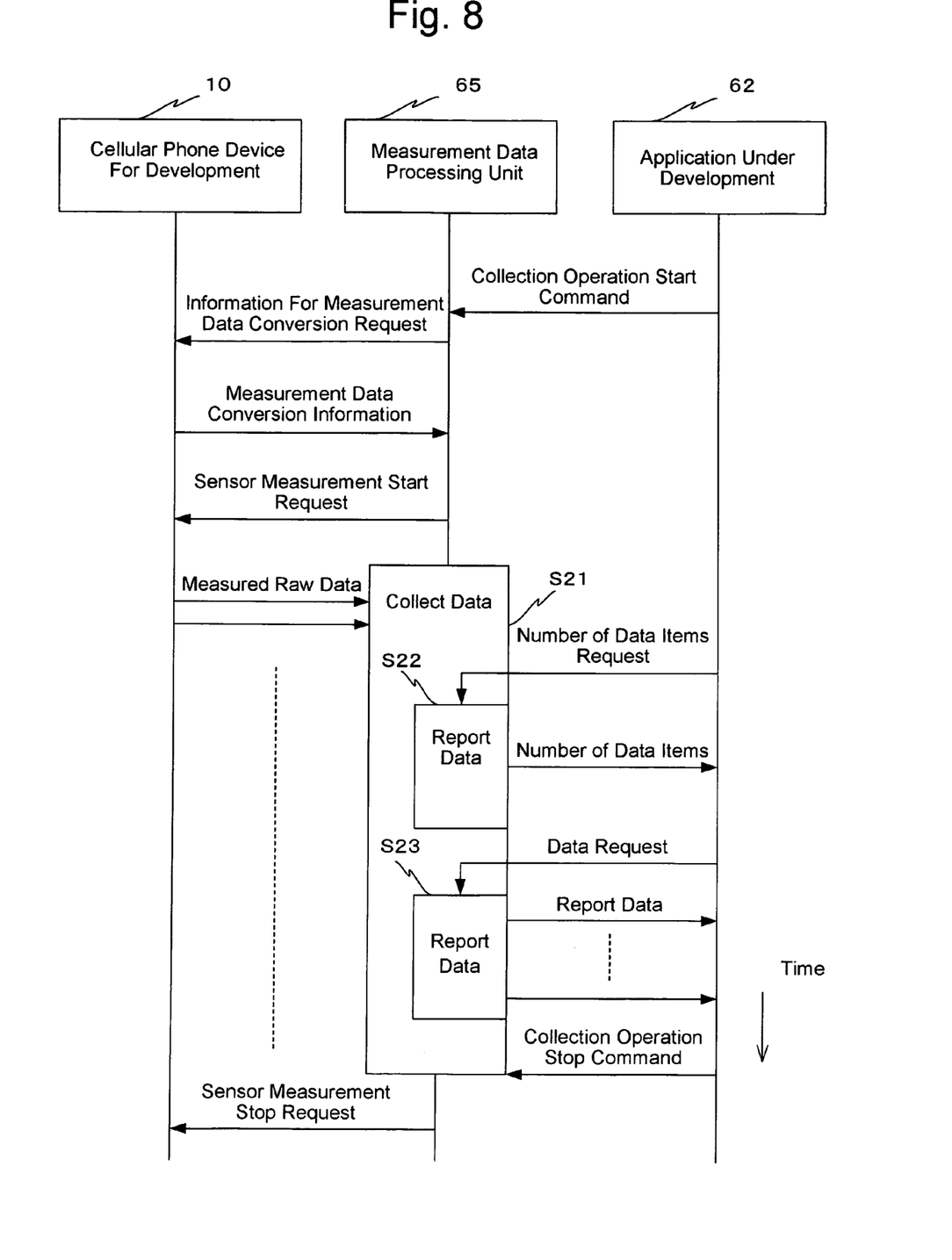
FIG. 8 is a sequence diagram for overall explanation of acquisition processing of bulk measurement data.

In bulk acquisition of measurement data all together during data collection, as shown in FIG. 8, first the application under development 62 sends to the measurement data processing unit 65 a collection operation start command with a data collection period TP2 (which may be the same as the data collection period TP1 described above, or may be different) set as a parameter. Here, for the data collection period TP2, an integral multiple of the notification period for the periodic data generated by measurement from the sensor unit 25 is designated, in a similar manner to the case of the data collection period TP1 described above.

By this collection operation start command, the measurement data processing unit 65 is notified of the fact that the measurement data which satisfies the data collection condition is the measurement data which was initially obtained after the collection operation start command, and the measurement data which is sequentially obtained thereafter over the interval of the data collection period TP2.

Figure 9:
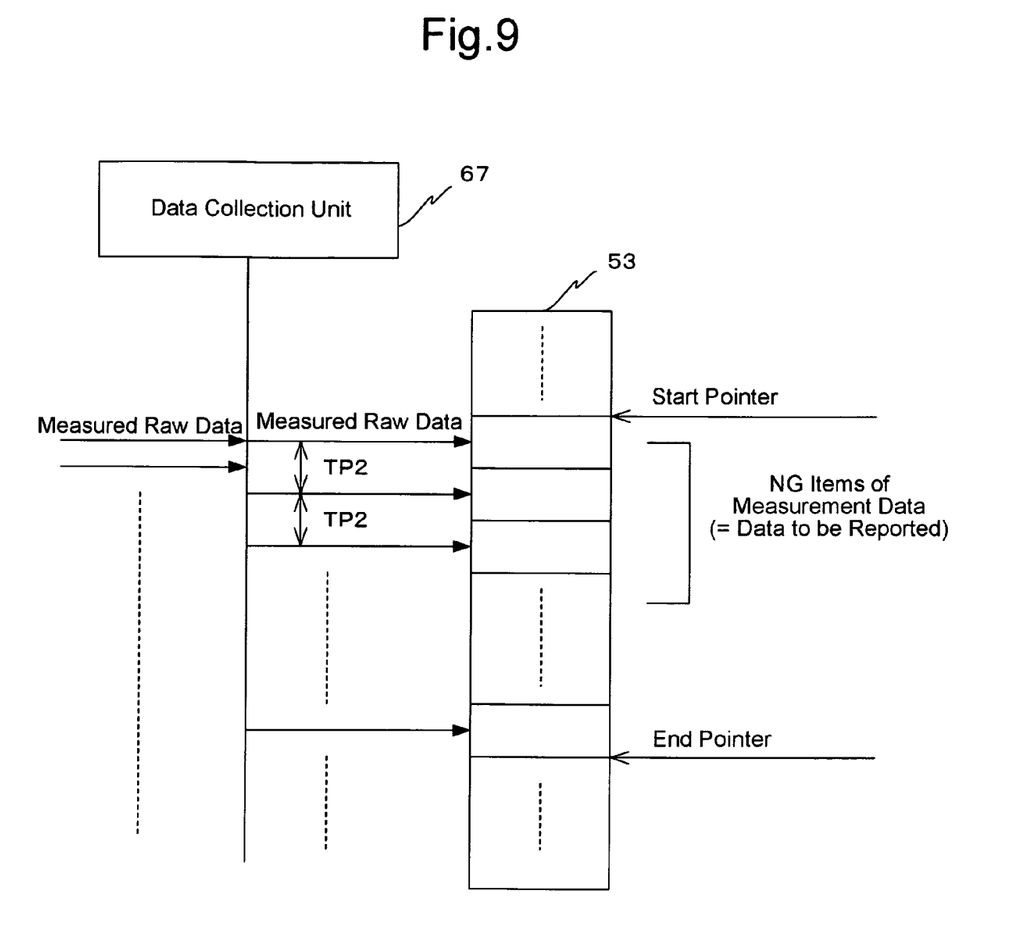
FIG. 9 is a figure for overall explanation of data collection during acquisition processing of bulk measurement data.

In the measurement data processing unit 65, the acquisition and reporting control unit 66 receives this collection operation setting command. Next, in a similar manner to the case described above of acquisition of the most recent data during data collection, the acquisition and reporting control unit 66 performs acquisition of measurement data conversion information from the telephone device for development 10. Subsequently, the acquisition and reporting control unit 66, along with performing transmission of a sensor measurement start request to the cellular phone device for development 10, also performs notification of the data collection period TP1, which constitutes the data collection condition, to the data collection unit 67. Upon receipt of this notification, the data collection unit 67 starts the data collection processing of the step S21. In this step S21, processing which is similar to that in the step S21 described above is performed, except for the fact that the data collection period is T2. The operation of data collection by the data collection unit 67 in the step S21 in this manner, and the operation of storage in the measurement data region 53, are shown in FIG. 9.

Returning to FIG. 8, at a desired time point during the above described data collection by the data collection unit 67, the application under development 62 sends to the measurement data processing unit 65 a request which specifies, among the measurement data stored within the measurement data region 53, the number of them which can be reported (hereinafter this is termed the "number of data items which can be reported" or simply the "number of data items"). In the measurement data processing unit 65, the acquisition and reporting control unit 66 receives this request for the number of data items which can be reported. Next, the acquisition and reporting control unit 66 notifies the data reporting unit 68 that it has received this request for the number of data items which can be reported. Upon receipt of this notification, in the step S22, the data reporting unit 68 starts number of data items reporting processing.

In the step S12, first, the data reporting unit 68 refers to the start pointer value and to the end pointer value. Next, the data reporting unit 68 calculates the number of data items which can be reported, using the start pointer value and the end pointer value. The data reporting unit 68 reports this number of data items which can be reported, which it has calculated, to the application under development 62. Upon receipt of this report of the number of data items which can be reported, the application 62 makes a decision as to whether or not the number of data items which can be reported is greater than or equal to a desired number of data items. If this decision is negative, then the application under development 62, issues a request for the number of data items which can be reported at some desired time point thereafter, and, at that time point, makes a decision as to whether or not the number of data items which can be reported is greater than or equal to the desired number of data items; and this is repeated until the result of the decision is affirmative.

When it is confirmed that the number of data items which can be reported has become greater than or equal to the desired number of data items, then the application under development 62 sends to the measurement data processing unit 65 a data request for bulk acquisition, in which the desired number of measurement data items NG is set as a parameter. By this data request for bulk acquisition, the measurement data processing unit 65 is notified that measurement data which satisfies the data reporting condition is to be measurement data which has been collected by the data collection unit 67 before the issue time point for the data request, and is to be NG items of measurement data from the oldest in order.

In the measurement data processing unit 65, the acquisition and reporting control unit 66 receives this data request for bulk acquisition. Next, the acquisition and reporting control unit 66 notifies the data reporting unit 68 that it has received this data request for bulk acquisition, and of the number of measurement data items NG. Upon receipt of this notification, the data reporting unit 68 starts data reporting processing in the step S23.

In the step S23, first, the data reporting unit 68 refers to the start pointer value. Next, the data reporting unit 68 reports NG items of measurement data (refer to FIG. 9) from the measurement data at the address in the measurement data region 53 indicated by the start pointer value, along the direction in which time elapses, as report data to the application under development 62. Moreover, the data reporting unit 68 sets the value of the start pointer to the address in storage of the next collected item of measurement data after the most recent one of the items of measurement data which have been reported, and notifies the acquisition and reporting control unit 66 that the data reporting task has been completed. In this manner, the processing of the step S23 ends.

By processing like the above being performed, the application under development 62 is able to acquire the desired number of measurement data items, in order from the oldest among the measurement data which is stored in the measurement data region 53.

It should be understood that the stoppage processing for the sensor measurement operation is performed in a similar manner to the case described above of acquiring the most recent data during data collection.

As has been explained above, in this embodiment, when the acquisition and reporting control unit 66 of the measurement data processing unit 65 in the development support device 50 sends a sensor measurement start request to the cellular phone device for development 10 in response to a collection operation start command from the program under development 62 accompanied by a collection condition, the acquisition and reporting control unit 36 of the measurement data processing unit 35 in the cellular phone device for development 10 starts measurement operation by the sensor. As a result, the measurement operation by the sensor portion 26 is started, and the measured raw data is continuously notified to the data collection unit 37 of the measurement data processing unit 35. Each time it receives this notification of the measured raw data, the data collection unit 37 sends the results of the measured raw data which have been notified to the development support device 50.

Furthermore, in response to the collection operation start command from the program under development 62, the acquisition and reporting control unit 66 of the measurement data processing unit 65 in the development support device 50 starts the collection of measurement data by the data collection unit 67. In response to a data request accompanied by a reporting condition from the program under development 62, the data reporting unit 68 reports measurement data which satisfy the reporting condition to the program under development 62.

As a result, no pseudo-data is created corresponding to results of measurement by the sensor portion 26; instead, by actually moving the cellular phone device for development 10, measurement data is supplied to the program under development 62 according to the results of measurement of the sensor portion 26 which correspond to various types of patterns of movement method. Thus, according to the program development system 100 of this embodiment, it is possible to provide a satisfactory development environment when developing an application program which is to be executed upon a cellular phone device on which a sensor for its own acceleration and attitude angle is implemented, and which utilizes the results of measurement by the sensor unit.

Moreover, it is possible to make the measurement data which satisfies the reporting condition be the newest measurement data within the measurement data region 53. By doing this, the program under development 62 is able to acquire the most recent measurement data which satisfies the data collection condition at the time point of the data request.

Furthermore, it is possible to make the measurement data which satisfies the reporting condition (a) be newer measurement data stored in the measurement data region than the measurement data which was reported in response to the previous bulk data request; and moreover (b) satisfy the condition of being the designated number of items of measurement data, as designated by the program under development 62, along the direction in which time elapses, from the oldest among the data which can be reported which is measurement data present within the measurement data region 53. By doing this, it is possible to use the measurement data region as a FIFO (First In First Out) type storage means.

Moreover, if it has received a request from the program under development 62 to notify the number of data items which can be reported, then the data reporting unit 68 reports the number of data which can be reported to the program under development 62. By doing this, it is possible to know the number of items of data which can be reported within the measurement data region 53, before a bulk data request. Due to this, by issuing a measurement data request which designates said desired number of data items as the specified number after having confirmed the presence of at least the desired number of data items which can be reported, it is possible for the program under development 62 reliably to acquire the desired number of items of measurement data.

Furthermore, the application under development issues a collection operation start command accompanied by a collection period, which constitutes the collection condition. Due to this, by the program under development designating the desired collection period, it is possible to collect measurement data corresponding to the measured raw data received from the cellular phone device for development 10 over the interval of said desired collection period.

Moreover when, in response to a collection operation stop command from the program under development 62, the acquisition and reporting control unit 66 of the measurement data processing unit 65 in the development support device 50 sends a sensor measurement stop request to the cellular phone device for development 10, the acquisition and reporting control unit 36 of the measurement data processing unit 35 in the cellular phone device for development 10 stops measurement operation by the sensor. Furthermore, in response to a collection operation start command from the program under development 62, the acquisition and reporting control unit 66 of the measurement data processing unit 65 in the development support device 50 stops the collection of measurement data by the data collection unit 67. Due to this, by issuing a collection operation stop command at a desired time point, the program under development 62 is able to stop the operation of measurement by the sensor portion 26 and the operation of collection by the data collection unit 67.

It should be understood that, in the embodiment described above, it is arranged for the application under development 62 to set the collection condition at the time of the collection operation start command, and to set the reporting condition at the time of requesting the data. By contrast, it would also be acceptable to arrange for the application under development 62 to set both the collection condition and also the reporting condition at the time of the collection operation start command. In this case, it is possible to arrange, when the data collection unit 67 has completed measurement data which satisfies the reporting condition while partway through performing the collection of measurement data which matches the collection condition, to report to the program under development 62 the fact that data which satisfies the reporting condition or data which satisfies the reporting condition has been completed. Accordingly, during so called processing for collection of measurement data until the generation of measurement data outside a data value range which is specified by a predetermined threshold value, for reporting, in the measurement data which have been collected, the most recent data item less than or equal to a predetermined number, and the like, it is possible to reduce the additions to the application under development.

Moreover, in the embodiment described above, along with sensor measurement by the cellular phone device for development 10 being started in response to a collection operation start command from the program under development 62, it is arranged for the operation of collection of measurement data by the data collection unit 67 also to be started. By contrast, it would also be possible to arrange for a command for starting the sensor measurement by the cellular phone device for development 10, and a command for starting the operation of collection of measurement data by the data collection unit 67, to be issued separately by the application under development 62.

Moreover, in the embodiment described above, along with sensor measurement by the cellular phone device for development 10 being stopped in response to a collection operation stop command from the program under development 62, it is arranged for the operation of collection of measurement data by the data collection unit 67 also to be stopped. By contrast, it would also be possible to arrange for a command for stopping the sensor measurement by the cellular phone device for development 10, and a command for stopping the operation of collection of measurement data by the data collection unit 67, to be issued separately by the application under development 62.

Moreover, in the embodiment described above, the application under development 62 was made to issue a data request which specified, as the reporting condition, a desired number of measurement data items. By contrast, it would also be possible to designate to make the application issue a data request which specifies a desired time interval as the reporting condition, instead of a desired number of data items. In this case, it is desirable to make the application under development 62, instead of requesting the number of data items which can be reported, time a time period from setting the data collection condition, or from the previous issue of a data request.

Furthermore, if the number of data items which can be reported is less than the number of data items specified by the data request, it may be arranged for the data reporting unit 68 to report to the application under development 62 error information to the effect that there is a shortage in the number of data items which can be reported. Moreover, it may also be arranged for the data reporting unit 68, at the time point of receiving the data request, to report information consisting of all of the data which can be reported, and of the number of items of measurement data reported.

Moreover, in the embodiment described above, the sensor unit 25 was implemented internally to the cellular phone device for development 10. By contrast, it would also be acceptable to provide a configuration in which the sensor unit 25 is external to the cellular phone device for development 10, and in which the sensor unit 25 and the cellular phone device for development 10 are connected together via an interface port for external device connection of the cellular phone device for development 10, not shown in the figures.

Moreover although, in the embodiment described above, the sensor portion 26 of the sensor unit 25 was made to be a five axis sensor which detects the pitch angle $\theta_X$, the roll angle $\theta_Y$, the yaw angle $\theta_Z$, the acceleration $\alpha_X$ in the X direction, and the acceleration $\alpha_Y$ in the Y direction, it could also be made as a six axis sensor which also performs detection of the acceleration $\alpha_Z$ in the Z direction.

Moreover although, in the embodiment described above, the positional relationship between the actuation unit 12 upon which the keys are arrayed, and the display unit 13, is that of a fixed so called straight type cellular phone device, it would also be possible to apply the present invention to a cellular phone device of a so called clamshell type, slide type, or revolver type or the like.

Furthermore, it would be possible to determine the axial direction which is used as a reference for measurement by the sensor unit 25, in correspondence to the position of arrangement of the sensor unit 25, or the type of device of the cellular phone.

Moreover although, in the embodiment described above, the present invention was applied to the development of an application to be executed upon a cellular phone device, of course it would be possible also to apply the present invention to the development of an application to be executed upon a portable information device of a different type, such as a portable type gaming machine, a car navigation device, a PDA (Personal Digital Assistance), or the like.

As has been explained above, the program development system of the present invention may be applied to a program development system which is used when developing an application program which is executed upon a portable information device equipped with a sensor, and which utilizes the result of measurements by that sensor

What is claimed is:

1. A program development system which comprises a portable information device for development and a development support device comprising a program development environment on which an application program to be executed on a portable information device is developed, characterized in that:

said portable information device for development comprises:
  a sensor which measures an acceleration and an attitude angle of said portable information device for development; and
  a sensor control unit which, in response to a measurement start request from said development support device, along with starting measurement operation by said sensor, also sends the results of measurement by said sensor to said development support device; and
said development support device comprises:
  a sensor measurement control unit which, in response to a sensor measurement start command from said application program, sends said measurement start request to said portable information device for development;
  a measurement data collection unit which, in response to a measurement data collection start command from said application program, starts collecting measurement data corresponding to said results of measurement, and which stores the collected measurement data in a collected measurement data storage unit;
  a measurement data reporting unit which reports measurement data which satisfy a reporting condition designated by said application program, to said application program while the application program is being tested on the program development environment; wherein
said measurement data reporting unit, when a measurement data report request has been received from said application program, reports measurement data satisfying said reporting condition to said application program;
said measurement data reporting request is accompanied by said reporting condition;
said measurement data which satisfies said reporting condition which is stored in said collected measurement data storage unit is newer than earlier measurement data which was reported in response to a previous measurement data report request; and
said measurement data comprises a designated number of items of measurement data, as designated by said application program, starting from the oldest among the data within said collected measurement data storage unit.

2. A program development system according to claim 1, characterized in that:
  said measurement data collection start command is accompanied by a collection condition; and
  said measurement data collection unit collects measurement data which satisfies said collection condition.

3. A program development system according to claim 2, characterized in that said collection condition consists of a collection period.

4. A program development system according to claim 1, characterized in that:
  said sensor measures:
  acceleration in at least two axial directions among a first axis, a second axis which is orthogonal to said first axis, and a third axis which is orthogonal to said first axis and to said second axis, defined intrinsically to said portable information device; and rotational angle around said first axis, rotational angle around said second axis, and rotational angle around said third axis, from a reference angle of said portable information device.

5. A program development system according to claim 1, characterized in that:
  said measurement data which satisfies said reporting condition is the newest measurement data within said collected measurement data storage unit.

6. A program development system according to claim 1, characterized in that:

said support device for development further comprises a number of measurement data items reporting unit which, when a request for notification of the number of said data items which can be reported has been received from said application program, reports the number of said data items which can be reported to said application program.

7. A program development system according to claim 1, characterized in that:

said measurement data collection start command is accompanied by a collection condition and said reporting condition; and said measurement data collection unit collects measurement data which satisfies said collection condition.

8. A program development system according to claim 1, characterized in that:

said measurement data collection unit, in response to a measurement data collection stop request from said application program, stops the collection of said measurement data.

9. A program development system according to claim 1, characterized in that:

said sensor measurement control unit, in response to a measurement stop command from said application program, sends a measurement stop request to said portable information device for development; and said sensor control unit stops the measurement operation by said sensor in response to said measurement stop request.

10. An apparatus, comprising:
(1) a portable device, wherein the portable device comprises
a processor to run programs, the programs including an application,
a keypad coupled to the processor,
a sensor detecting an acceleration and an attitude angle of the portable device, and
a portable-device interface;
(2) an application development computer that develops an application program of the portable device, wherein said application development computer comprises
a CPU and
an application-development-computer interface;
(3) wherein the apparatus includes an information link between the portable-device interface and the application-development-computer interface; and
(4) wherein the application development computer, when the application is under development, sends a measurement start request to the portable device, whereupon in response to the measurement start request the processor sends measurement data from the sensor to the application development computer, and the application development computer stores the measurement data in a collected measurement data storage unit if a reporting condition is satisfied, and reports the measurement data while the application is being tested in the application development computer.

11. The apparatus according to claim 10, wherein the measurement data which satisfies the reporting condition includes (a) newer measurement data and/or (b) a designated number of items of measurement data, as designated by the application program, whereby the collected measurement data storage unit functions as a FIFO (First In First Out) type storage unit.

12. The apparatus according to claim 10, characterized in that:

said sensor measures:

acceleration in at least two axial directions among a first axis, a second axis which is orthogonal to said first axis, and a third axis which is orthogonal to said first axis and to said second axis, defined intrinsically to said portable information device; and rotational angle around said first axis, rotational angle around said second axis, and rotational angle around said third axis, from a reference angle of said portable information device.

13. The apparatus according to claim 10, characterized in that:

said measurement data which satisfies said reporting condition is the newest measurement data within said collected measurement data storage unit.

14. The apparatus according to claim 10, characterized in that: said support device for development further comprises a number of measurement data items reporting unit which, when a request for notification of the number of said data items which can be reported has been received from said application program, reports the number of said data items which can be reported to said application program.

15. The apparatus according to claim 10, characterized in that:

a measurement data collection start command is accompanied by a collection condition; and said measurement data collection unit collects measurement data which satisfies said collection condition.

16. The apparatus according to claim 10, characterized in that said collection condition consists of a collection period.

17. The apparatus according to claim 10, characterized in that:

said measurement data collection unit, in response to a measurement data collection stop request from said application program, stops the collection of said measurement data.

18. The apparatus according to claim 10, characterized in that:

said sensor measurement control unit, in response to a measurement stop command from said application program, sends a measurement stop request to said portable information device for development; and said sensor control unit stops the measurement operation by said sensor in response to said measurement stop request.

* * * * *